(12) United States Patent
Sakaguchi et al.

(10) Patent No.: US 7,370,973 B2
(45) Date of Patent: May 13, 2008

(54) DISPLAYING OPTICAL SYSTEM AND IMAGE PROJECTION APPARATUS

(75) Inventors: Ryuichi Sakaguchi, Machida (JP); Keiichiro Ishihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 300 days.

(21) Appl. No.: 11/192,606

(22) Filed: Jul. 29, 2005

(65) Prior Publication Data
US 2006/0023164 A1   Feb. 2, 2006

(30) Foreign Application Priority Data
Jul. 30, 2004  (JP)  ............... 2004-224788

(51) Int. Cl.
G03B 21/28 (2006.01)
G03B 21/14 (2006.01)
(52) U.S. Cl. ............... 353/20; 353/37; 348/800
(58) Field of Classification Search .......... 353/30, 353/28, 31, 33, 69, 81, 84, 122; 349/9, 18, 349/62, 64; 348/800–803, 771, 746, 747
See application file for complete search history.

(56) References Cited
U.S. PATENT DOCUMENTS
4,812,861 A * 3/1989 Sasaki et al. ............... 396/548
6,154,259 A * 11/2000 Hargis et al. ............... 348/756
6,956,878 B1 * 10/2005 Trisnadi ..................... 372/27
6,999,161 B2 * 2/2006 Bleeker et al. ............. 355/67
2003/0214633 A1 * 11/2003 Roddy et al. ............... 353/31
2006/0023165 A1 * 2/2006 Ishihara et al. ............. 353/20
2006/0126155 A1 * 6/2006 Kowarz et al. ............. 359/298

FOREIGN PATENT DOCUMENTS
| JP | 6208089 | 7/1994 |
| JP | 2000206449 | 7/2000 |
| JP | 2003021800 | 1/2003 |

* cited by examiner

Primary Examiner—Andrew T. Sever
(74) Attorney, Agent, or Firm—Morgan & Finnegan, LLP (57) ABSTRACT

A compact displaying optical system capable of reducing a speckle noise and a loss of light amount is disclosed. The displaying optical system which projects images using coherent light, comprises a light source which emits the light; and a polarization control unit. The polarization control unit changes the polarization state of the light emitted from the light source temporally.

8 Claims, 5 Drawing Sheets

SPECKLE PATTERN OF 0 DEG

SPECKLE PATTERN OF 30 DEG

SPECKLE PATTERN OF 45 DEG

SPECKLE PATTERN OF 90 DEG

FIG. 3

|  | CORRELATION COEFFICIENT |
|---|---|
| SPECKLE PATTERN OF 0 DEG. VS SPECKLE PATTERN OF 30 DEG. | 0.50 |
| SPECKLE PATTERN OF 0 DEG. VS SPECKLE PATTERN OF 45 DEG. | 0.28 |
| SPECKLE PATTERN OF 0 DEG. VS SPECKLE PATTERN OF 90 DEG. | 0.04 |

DISPLAYING OPTICAL SYSTEM AND IMAGE PROJECTION APPARATUS

FIELD OF THE INVENTION

The present invention relates to a displaying optical system which projects images using coherent light (light with coherence) such as a laser beam.

BACKGROUND OF THE INVENTION

Many image projection apparatuses which project images using a laser beam have been proposed. For example, a laser scan display has been disclosed in Japanese Patent Laid-Open No. 2003-21800, which displays images on a screen by scanning the laser beam with a scanning device.

However, since the laser beam has high coherence, a speckle noise (that is, a granular interference pattern) which causes degradation of image quality appears in the displayed image.

A method for reducing a speckle noise has been disclosed in Japanese Patent Laid-Open No. 2000-206449, in which a transparent optical element having a refraction index "n" and including "N" areas whose thicknesses change by "Δt" is used. In the method, laser light that is a diverging luminous flux from a semiconductor laser (laser diode) is converted into a parallel luminous flux by a collimator lens, and enters the transparent optical element. The transparent optical element gives optical path differences "(n−1) Δt" to luminous fluxes (divided luminous flux) passing through portions with different thicknesses, thereby reducing the coherence of each divided luminous flux. It is possible to reduce the speckle noise by overlapping the incoherent luminous fluxes that have passed through the transparent optical element by a lens.

Furthermore, a method for reducing a speckle noise has been disclosed in Japanese Patent Laid-Open No. H06-208089, in which a laser beam is scattered with a rotatable diffusing element. The speckle pattern is changed at a speed undetectable to the human eye by rotating the diffusing element. Overlapping the speckle pattern changing at a high speed by the eye's afterimage effect makes it possible to reduce the speckle noise.

However, in the method disclosed in Japanese Patent Laid-Open No. 2000-206449, it is necessary to increase the step "Δt" of the transparent optical element to give enough optical path differences to the divided luminous fluxes. As a result, it becomes difficult to downsize the optical system. In particular, the size of the transparent optical element becomes larger when using light having a long coherence length such as a solid-state laser and a single-mode semiconductor laser.

Furthermore, in the method disclosed in Japanese Patent Laid-Open No. H06-208089, the loss of light amount becomes relatively large because the laser beam is transmitted through the diffusing element.

BRIEF SUMMARY OF THE INVENTION

One object of the present invention is to provide a compact displaying optical system capable of reducing a speckle noise and a loss of light amount.

A displaying optical system that is one aspect of the present invention is a displaying optical system which projects images using coherent light. The displaying optical system comprises: a light source which emits the light; and a polarization control unit which changes the polarization state of the light emitted from the light source temporally.

Other objects and further features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Embodiment 1

Figure 1:
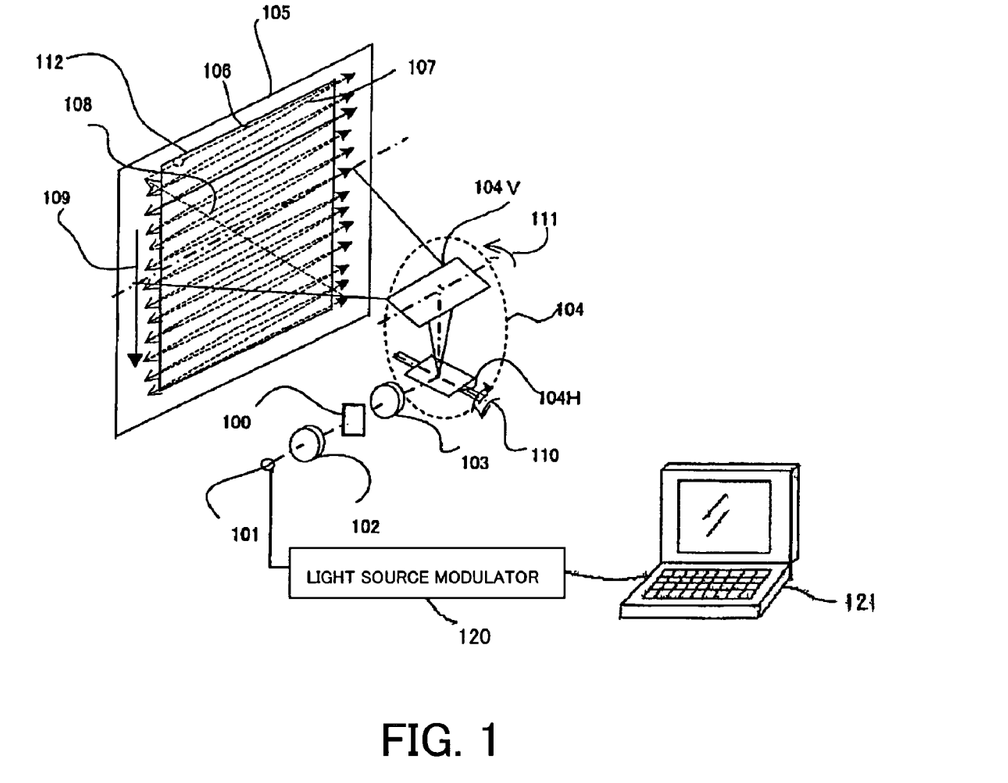
FIG. 1 is a schematic block diagram showing a displaying optical system used for an image projection apparatus that is Embodiment 1 of the present invention.

FIG. 1 shows a displaying optical system for an image projection apparatus that is Embodiment 1 of the present invention. In FIG. 1, reference numeral 101 denotes a laser source which is a light source emitting coherent light. The luminous flux emitted from the laser source 101 is converted into a substantially parallel luminous flux by a collimator lens 102.

A light-source modulator 120 is connected to the laser source 101. The light-source modulator 120 modulates the intensity of the laser light emitted from the laser source 101 according to image signals input from an image-signal supplying apparatus 120 such as a personal computer, DVD player, video cassette recorder, or television tuner.

The substantially parallel luminous flux (hereinafter, it is referred to as a laser beam) emerged from the collimator lens 102 enters a polarization control unit 100 which changes the polarization state of the laser beam temporally. A detailed description of the polarization control unit 100 will be given later.

The polarization state means a pattern of polarized light such as a polarization direction of linearly-polarized light and a major-axis direction of elliptically-polarized light.

The laser beam emerged from the polarization control unit 100 enters a condensing optical system 103, and then impinges on a scanning device 104.

The scanning device 104 is constituted by a horizontal scanning mirror 104H and a vertical scanning mirror 104V, and scans the impinged laser beam in a two-dimensional direction. In this embodiment, a MEMS (Micro Electro Mechanical System) mirror device which is manufactured using semiconductor manufacturing techniques is used as the horizontal scanning mirror 104H; the device can perform a reciprocating rotational motion (resonant oscillation) of a mirror by using electromagnetic force or the like. The mirror surface of the horizontal scanning mirror 104H has a very small size of 1.5 mm square. In contrast, a galvanometer mirror is used as the vertical scanning mirror 104V in this embodiment.

In addition, the present embodiment uses the horizontal scanning mirror 104H and the vertical scanning mirror 104V, each deflecting (scanning) the laser beam in a one-dimensional direction. However, a MEMS mirror device which oscillates a mirror in a two-dimensional direction may be used.

The laser beam scanned by the scanning device 104 directs to a scan surface (projection surface) 105 such as a screen and a wall surface. The laser beam emitted from the laser source 101 and substantially condensed by the collimator lens 102 and the condensing optical system 103 forms an image. Therefore, the image of the light source is scanned by the scanning device 104 in the two-dimensional direction.

In FIG. 1, an arrow 110 indicates the rotational direction of the horizontal scanning mirror 104H, and an arrow 111 indicates the rotational direction of the vertical scanning mirror 104V. The rotation of the vertical scanning mirror 104V in the direction indicated by the arrow 111 scans a spot (image of the light source) of the laser beam in the direction indicated by an arrow 109 on the scan surface 105. Therefore, on the scan surface 105, scanning lines 106 and 107 reciprocating in the horizontal direction are formed from the upper end towards the lower end of the scan surface 105. Thereby, one frame image is displayed by an afterimage effect of human's eyes.

The vertical scanning mirror 104V forms the scanning line 106 on the lower end of the scan surface 105, and then forms the scanning line 106 on the upper end thereof to form the next frame image. This operation is subsequently repeated. For example, in a case where scanning of 60 Hz in the vertical direction is repeated to form SVGA images of 800 pixels in the horizontal direction and 600 pixels in the vertical direction, since 300 horizontal scanning lines are required for each of the outward and homeward routes, a resonant frequency of 18 kHz (60 Hz×300) is required for the horizontal scanning mirror 104H. In FIG. 1, a smaller number of scanning lines than the actual number thereof are indicated.

An area 112 on the scan surface 105 is an area where images are actually displayed. Since the horizontal scanning mirror 104H oscillates in a sinusoidal manner, the speed thereof becomes low at the vicinity of the maximum amplitude position, which state unfits to display images. Therefore, the images are displayed only in the area 112 on the inner side of the area corresponding to the maximum amplitude position of the horizontal scanning mirror 104H.

This embodiment uses the polarization control unit 100 which temporally changes the polarization state of the laser beam directing from the laser source 101 to the scan surface 105, especially the laser beam directing from the laser source 101 to the scanning device 104. The polarization state means a polarization direction in this embodiment.

Figure 2:
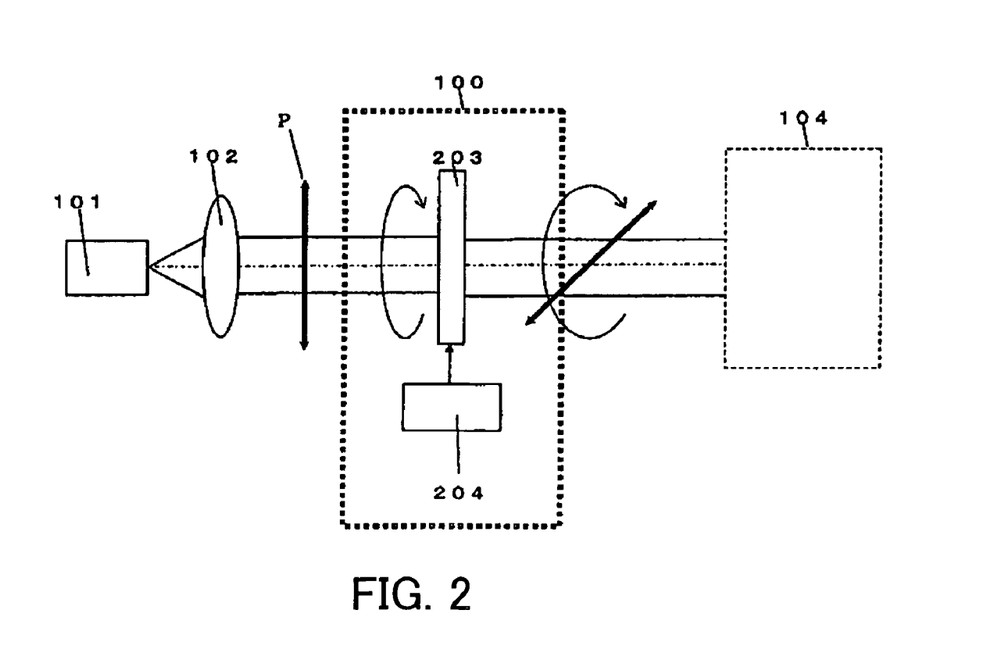
FIG. 2 is an explanatory diagram showing the structure of a polarization control unit using a ½-wave plate in Embodiment 1.

The description of the polarization control unit 100 will hereinafter be given with reference to FIG. 2. FIG. 2 schematically shows a horizontal section of the optical system from the laser source 101 to the scanning device 104.

This embodiment uses the laser source 101 emitting linearly-polarized light. In FIG. 2, the symbol P schematically shows the polarization direction of the laser beam. The polarization control unit 100 is constituted by a ½-wave plate 203 that is a polarized-wave control element, and a driving mechanism 204 including a motor and a member for transmitting the rotation of the motor to the ½-wave plate 203.

The laser beam emerged from the collimator lens 102 enters the ½-wave plate 203. The driving mechanism 204 rotates the ½-wave plate 203 around an axis substantially parallel to the traveling direction of the laser beam. The rotation of the ½-wave plate 203 rotates the polarization direction P of the laser beam emerged from the ½-wave plate 203 at a speed twice the rotating speed of the ½-wave plate 203. The laser beam emerged from the ½-wave plate 203 reaches the scanning device 104, and is deflected (scanned) in the two-dimensional direction. Thereby, the spot formed by the laser beam on the scan surface 105 is scanned in the two-dimensional direction.

The description will hereinafter be given of the principle of speckle noise reduction by the function of the polarization control unit 100 described above.

The speckle noise is expressed by overlapping of scattering light components of the laser beam reflected on the screen, which is disposed on the scan surface 105, with a random phase relationship on an observer's retina.

The average value of surface asperity (root mean square roughness) of normal screens is greater than the wavelength of the laser light, and its average interval (correlation length of the surface roughness) is much smaller than the diameter of the irradiation spot. Therefore, many spherical waves whose phases uniformly distribute between 0 and 2n are mixed in the scattering light from the screen. The components of the scattering light overlap with each other on the observer's retina, thereby generating an irregularly granular interference pattern. This pattern is the speckle pattern.

There is a method for reducing the speckle noise, in which the speckle intensity is smoothed by overlapping a plurality of speckle patterns having a low correlation with each other. Overlapping N speckle patterns having a low correlation with each other (in other words, independent speckle patterns) reduces the speckle contrast C expressing a quantification value of the speckle intensity by a fraction of $\sqrt{N}$. The speckle contrast C is defined as a ratio of a standard deviation "σI" of the speckle intensity "I" to an average value thereof "<I>", as described below.

$$C = \sigma I / <I>$$

To reduce the speckle noise by using this method, it is ideally preferable to overlap a plurality of speckle patterns having no correlation with each other (in other words, speckle patterns having a relationship in which the after-mentioned correlation coefficient becomes zero). However, it is difficult to produce a plurality of speckle patterns having no correlation. Therefore, it is necessary to produce a plurality of speckle patterns having a low correlation with each other (having a small correlation coefficient).

The present embodiment also uses the method for reducing the speckle noise by generating a plurality of speckle patterns having a low correlation with each other, and overlapping the speckle intensities (speckle patterns).

Figure 3:
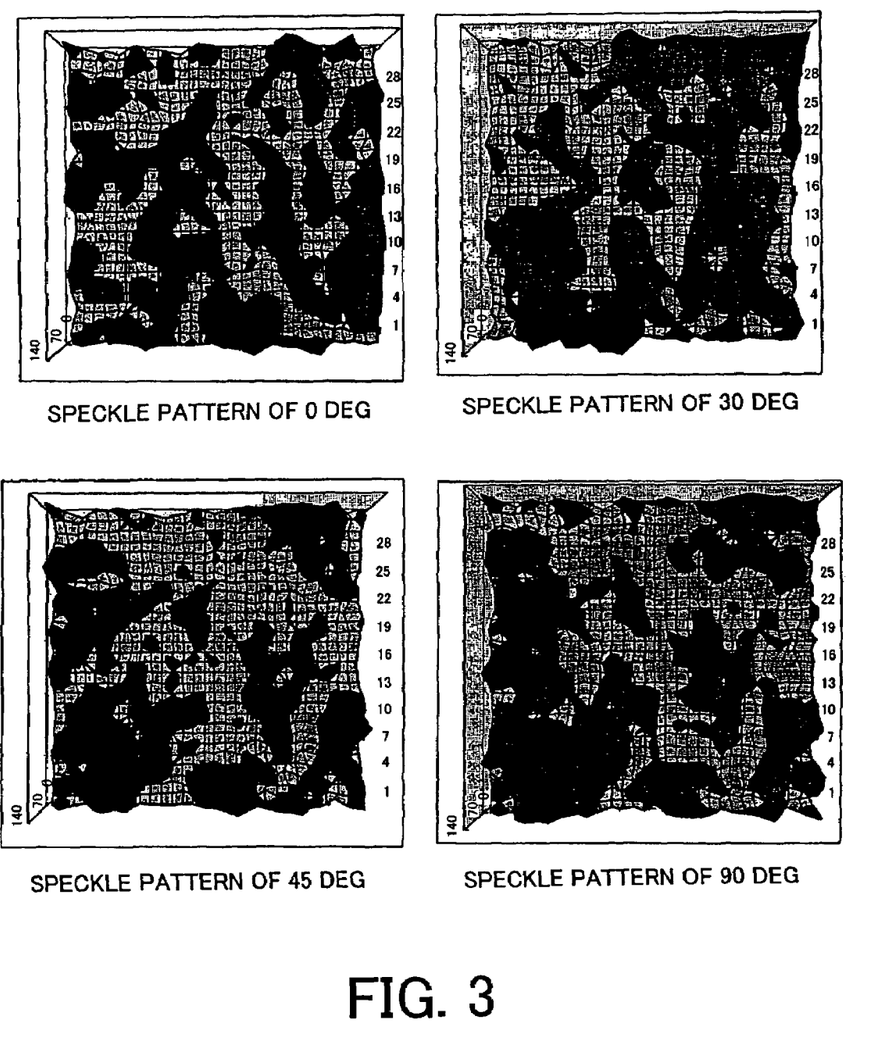
FIG. 3 is an explanatory diagram showing an appearance of a speckle pattern (an example of experiment) in Embodiment 1.

Here, the description will be given of the relationship between polarization directions of laser beams impinging on a screen and speckle patterns on the basis of experimental results. FIG. 3 shows contour plans expressing the speckle intensities in cases where the polarization direction of the laser beam with respect to the horizontal direction of the screen are 0, 30, 45 and 90 degrees. The horizontal and vertical directions in FIG. 3 correspond to those of the screen, and a black portion in FIG. 3 represents a portion where the speckle intensity on the screen is high.

As shown in FIG. 3, the speckle patterns in the displayed image were different from each other depending on the polarization direction of the laser beam impinging on the screen. Further, regarding to the correlation between the speckle pattern generated by the linearly-polarized light having a plane of vibration in the horizontal direction of the screen and the speckle pattern generated by the linearly-polarized light that forms an angle "θ" with the horizontal direction, the correlation of the speckle patterns became lower as θ became larger. The speckle patterns became independent patterns having no correlation with each other in the case where their polarization directions were mutually orthogonal (θ=90 degrees).

Figure 4:
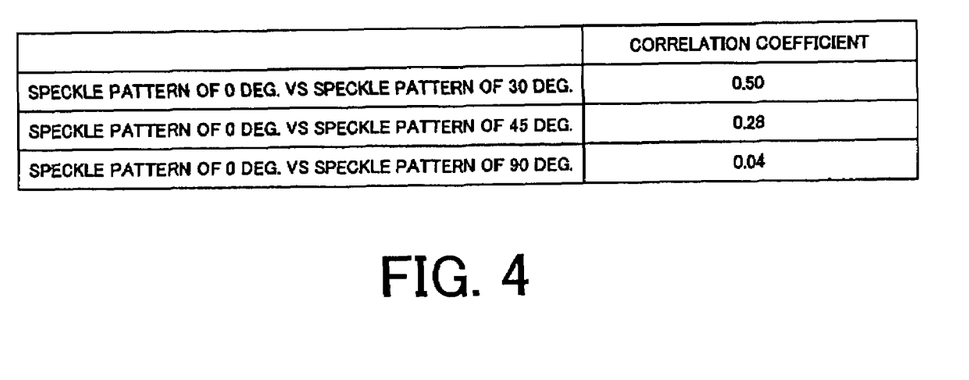
FIG. 4 is a table showing a correlation coefficient of a speckle pattern (an example of experiment) in Embodiment 1.

FIG. 4 shows the calculation result of the correlation coefficient of speckle patterns, specifically correlation coefficients between the speckle patterns generated by two linearly-polarized light components whose difference of the polarization directions is 30, 45, and 90 degrees. To reduce the intensity of the speckle pattern, it is preferable that the correlation coefficient between the speckle patterns generated by two rays whose difference of the polarization directions is 90 degrees is equal to 0.1 or less, and more preferably, it is equal to 0.05 or less.

In other words, by adopting a configuration in which a plurality of speckle patterns including a speckle pattern that makes the correlation coefficient with a predetermined speckle pattern equal to 0.1 or less (preferably, equal to 0.05 or less) can be overlapped, it becomes possible to reduce the speckle intensity (that is, the intensity of the speckle noise).

The correlation coefficient "r" between the speckle intensities "X1" and "X2" of the respective patterns is defined by using the average values of the speckle intensity "<X1>" and "<X2>", as described below.

$$r = \frac{\sum (X_1 - \langle X_1 \rangle)(X_2 - \langle X_2 \rangle)}{\sqrt{\sum (X_1 - \langle X_1 \rangle)^2} \sqrt{\sum (X_2 - \langle X_2 \rangle)^2}}$$

In the present embodiment, the polarization direction of the laser beam reaching the screen is changed temporally by the polarization unit 100.

Figure 5:
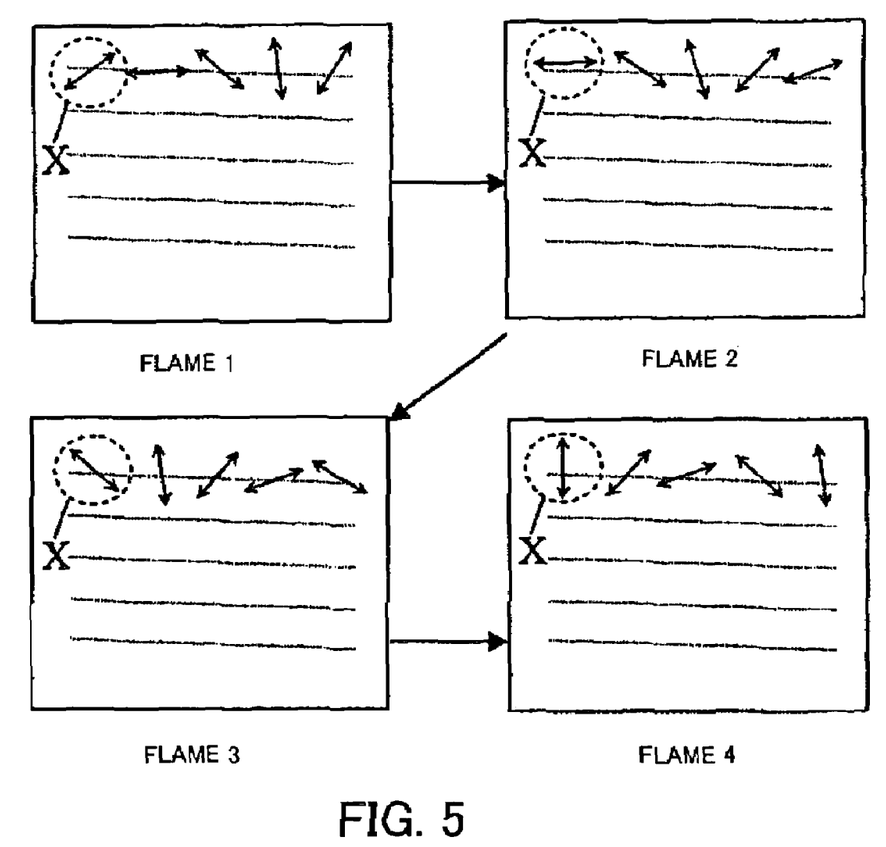
FIG. 5 is an explanatory diagram showing an appearance of the temporal change of the polarization direction of a laser beam impinging on a screen in Embodiment 1.

Next, the description will be given of the change of the laser beam's polarization direction using FIG. 5. The laser beam's polarization direction rotates with the rotation of the ½-wave plate 203. In the case where the laser beam is scanned on the screen, the position where the laser beam reaches changes with time. Therefore, the polarization direction of the laser beam reaching each position on the screen changes to a variety of directions as shown in FIG. 5. As described above, in this embodiment, the polarization unit 100 changes the polarization direction of the laser beam reaching the screen temporally.

The frames 1 to 4 are temporally continuous image frames. When focusing attention on a certain pixel X on the screen, the polarization direction of the laser beam at the pixel X changes sequentially from the frame 1 to the frames 2, 3 and 4. Therefore, the speckle pattern (speckle intensity) generated at the pixel X changes frame by frame.

In a case where each frame is drawn at a frame rate of 60 Hz, since the temporal change of the speckle pattern progresses faster than the human eye's afterimage time (generally, 1/30 seconds), the intensities of the speckle patterns generated in the respective frames are integrated by the afterimage effect. As a result, it is possible to reduce the speckle noise by overlapping the speckle intensities.

In this embodiment, it is possible to obtain the effect of reducing the speckle noise by rotating the polarization direction of the laser beam reaching the screen temporally by the rotation of the ½-wave plate 203. However, to obtain the effect of reducing the speckle noise, it is necessary that the polarization direction of the laser beam reaching a certain pixel X on the screen be changed frame by frame. Therefore, it is preferable to set the rotating speed of the ½-wave plate 203 so that the change period of the polarization direction may not become an integral multiple of the frame rate. Furthermore, to overlap the speckle intensities by the human eye's afterimage effect, it is preferable to set the rotating speed of the ½-wave plate 203 so that the speckle pattern may change within 1/30 seconds that is the human eye's afterimage time.

In a case where the frame rate is 60 Hz, for example, by setting the rotating speed of the ½-wave plate 203 so that the polarization direction of the laser beam may rotate by 90 degrees or more every 1/60 seconds, it is possible to reduce the speckle noise more effectively. To satisfy this condition, at least 1/8-rotation (45 degrees) of the ½-wave plate 203 is required every 1/60 seconds. Therefore, it is preferable to set the rotating speed of the ½-wave plate 203 at 450 rpm or more.

The inventor conducted an experiment in which a still image was displayed on a screen by using a solid-state laser emitting green light in a wavelength of 532 nm as the laser source 101, and rotating the ½-wave plate 203 of the polarization control unit 100 at 3,900 rpm. In this experiment, the speckle contrast C was reduced to 74% (from 0.31 to 0.23) compared to the case where the polarization control unit 100 was not used.

Since this embodiment has a configuration in which transmission of the laser beam through the ½-wave plate 203 makes the polarization direction of the laser beam change, a loss of light amount is not as much as when a diffusing plate is used, and it is possible to display images with a narrow diameter of the laser beam. In addition, disposing the polarization control unit 100 (½-wave plate 203) between the laser source 101 and the scanning device 104 makes it possible to reduce the size of the ½-wave plate 203, in other words, the size of the polarization control unit 100.

Although the condensing optical system 103 is disposed on the side closer to the laser source 100 than the scanning device 104 in this embodiment, the condensing optical system 103 may be disposed on the side closer to the scan surface 105 than the scanning device 104. Further, although this embodiment shows the scanning device 104 constituted by a one-dimensional scanning MEMS mirror device and a galvanometer mirror, or a two-dimensional scanning MEMS mirror device, other scanning devices can be used in the present invention.

Furthermore, although this embodiment uses the ½-wave plate 203 as a wave plate constituting the polarization control unit 100, the wave plate may be any other wave plates which give any phase difference to linearly-polarized light such as a 1/4-wave plate and a 1/8-wave plate. It is also possible to change the polarization state by rotating the ½-wave plate, thereby reducing the speckle noise.

Furthermore, although this embodiment uses a rotatable wave plate, any other elements which change the polarization state of the emerging light temporally can be used as the polarization control unit. For example, the polarization control unit 100' constituted by a polarized-wave control element 303 shown in FIG. 6, which is represented by lithium niobate and a variable Faraday rotator, can be used.

Figure 6:
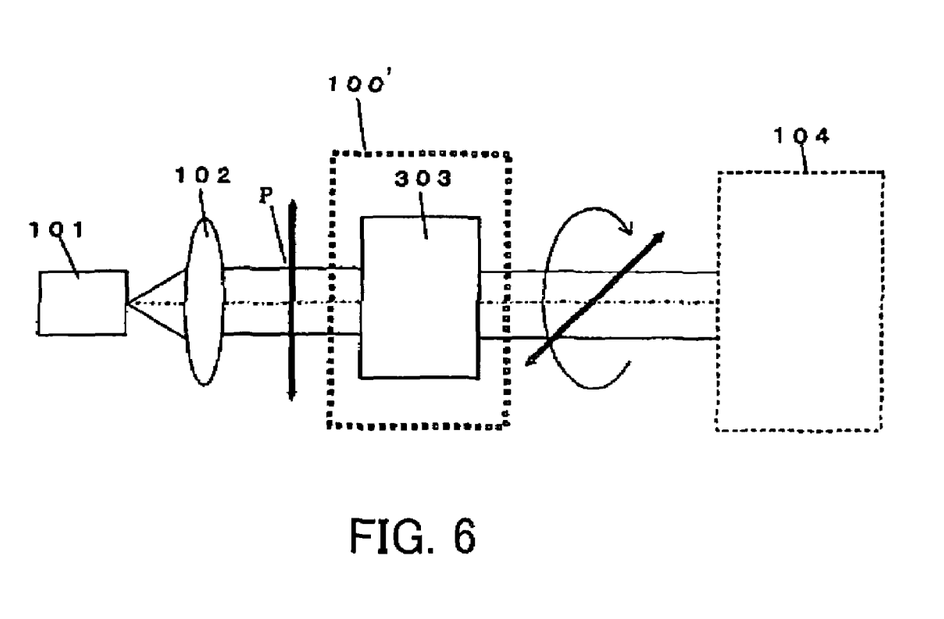
FIG. 6 is an explanatory diagram showing the structure of a polarization control unit using a polarization control device in Embodiment 1.

The polarized-wave control element 303 has a function of changing the polarization state of entering light into another polarization state according to an input electronic signal. Changing the electronic signal input to the polarized-wave control element 303 temporally makes it possible to change the polarization state of the laser beam, as is the case when a wavelength plate is rotated, thereby making it possible to obtain the effect of reducing the speckle noise.

Figure 7:
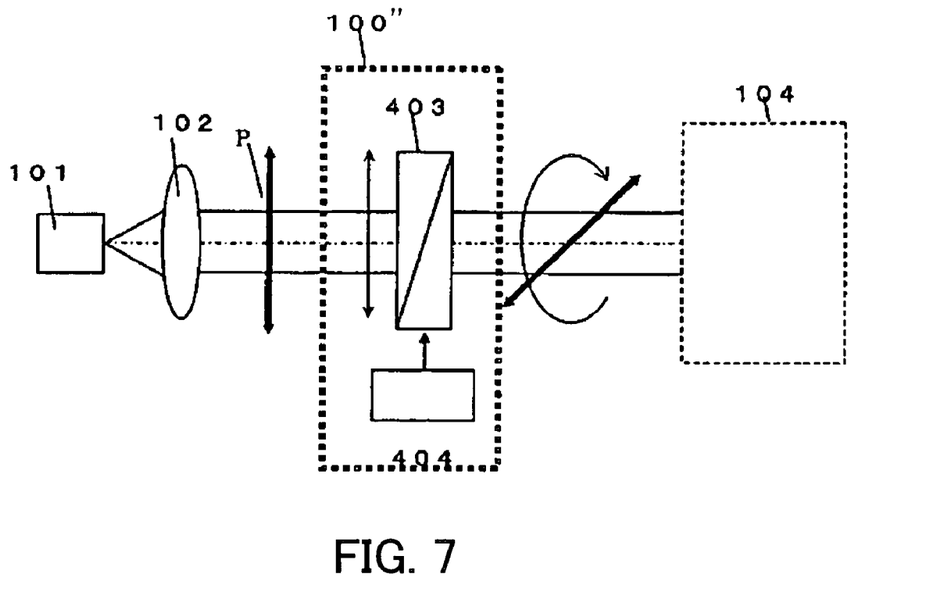
FIG. 7 is an explanatory diagram showing the structure of a polarization control unit using a birefringent element in Embodiment 1.

In addition, as shown in FIG. 7, a birefringent element 403 which gives different phase differences to polarization light according to its portions in a predetermined direction may be used as the polarization control unit 100". By moving the birefringent element 403 in the predetermined direction (a first direction substantially orthogonal to the traveling direction of the laser beam) by a driving mechanism 404 including an actuator and the like, it is possible to change the polarization state of the laser beam temporally. Therefore, it is possible to obtain the effect of reducing the speckle noise, as is the case when the ½-wave plate 203 is rotated.

Furthermore, although the result of an experiment in which a solid-state laser result was described in the above embodiment, in a case where a semiconductor laser emitting linearly-polarized light is used as the laser source, it is possible to obtain an effect of reducing the speckle noise as is the case when the solid-state laser is used. In addition, in a case where a monochromatic image is displayed with a blue laser or a red laser, it is possible to obtain an effect of reducing the speckle noise as is the case when the green laser is used.

Further, although an example of a scanning image projection apparatus in which a monochromatic laser is used as the laser source was shown in the above embodiment, an effect of reducing the speckle noise can be also obtained in a scanning color image projection apparatus in which three color lasers of red, green and blue colors are used as the laser source.

In a case where a color image is displayed, a white beam is produced by combining red, green and blue color laser beams. The ½-wave plate included in the polarization control unit is set to the wavelength of the green laser when it is disposed in the white beam. Setting the ½-wave plate to a certain wavelength means selecting the set (designed) wavelength of the ½-wave plate so that a phase difference of n may be given to the laser light that is transmitted through the ½-wave plate.

Using the ½-wave plate whose set wavelength is the green laser's wavelength makes it possible to maximize the effect of reducing the green speckle noise. Further, selecting the green laser's wavelength, which is an intermediate wavelength between red and blue, as the set wavelength of the ½-wave plate makes it possible to rotate the polarization direction of the red and blue laser light with a state of approximately linear polarization. Thereby, it is possible to maximize the effect of reducing the speckle noise of color images. Further, the ½-wave plate may be set to any wavelength between the central wavelengths of red and blue.

In addition, the polarization control unit may be disposed in each color's optical path before the red, green and blue laser beams are combined.

Embodiment 2

Figure 8:
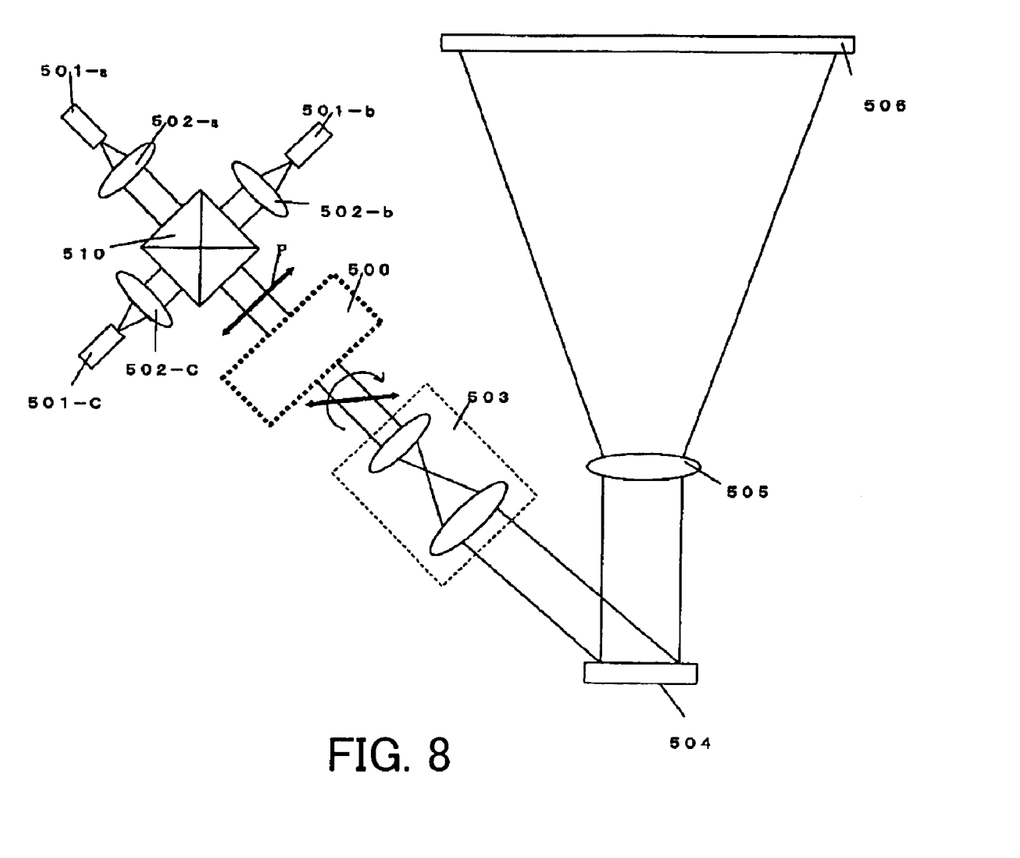
FIG. 8 is a schematic block diagram showing a displaying optical system used for an image projection apparatus that is Embodiment 2 of the present invention.

FIG. 8 shows a horizontal section of a displaying optical system used in an image projection apparatus that is Embodiment 2 of the present invention. This embodiment uses three color laser sources of red, green and blue.

The divergent luminous fluxes emitted from the red laser source 501-a, green laser source 501-b, and blue laser source 501-c are converted into substantially parallel luminous fluxes by collimator lenses 502-a, 502-b and 502-c, respectively, and then combined by a cross-dichroic prism 510. The luminous flux (laser beam) emerged from the cross-dichroic prism 510 enters a polarization control unit 500.

The laser beam emerged from the polarization control unit 500 enters an illumination optical system 503. The illumination optical system 503 enlarges the diameter of the entering laser beam, and converts the laser beam into a substantially parallel luminous flux to irradiate a spatial light modulator 504 with the laser beam.

The spatial light modulator 504 is a two-dimensional light modulator constituted by a Digital Micro-mirror Device (DMD), modulating incident light according to image signals from the image-signal supplying apparatus shown in FIG. 1. The laser beam emerged from the spatial light modulator 504 is projected on a projection surface 506 such as a screen by a projection optical system 505.

In this embodiment, the polarization direction of the laser beam reaching the projection surface 506 is changed temporally, thereby making it possible to obtain the effect of reducing the speckle noise as Embodiment 1. The polarization control unit 500 has the same configuration as that of the polarization control unit 100 in Embodiment 1.

Although the polarization control unit 500 (for example, a ½-wave plate) is disposed between the laser sources 501-a, 501-b and 501-c and the spatial light modulator 504, the polarization control unit 500 can be disposed at any position between the laser sources 501-a, 501-b and 501-c and the projection surface 506. However, it is possible to miniaturize the polarization control unit 500 by disposing it on the side closer to the projection surface than the spatial light modulator 504, especially between the laser sources 501-a, 501-b and 501-c and the spatial light modulator 504 or the illumination optical system 503. This is because the diameter of the laser beam is smaller in the area between the laser sources 501-a, 501-b and 501-c and the illumination optical system 503 than in the area on the side closer to the projection surface 506 than the illumination optical system 503.

In addition, although the two-dimensional light modulator is used in this embodiment, a one-dimensional light modulator which modulates the laser beam in a first one-dimensional direction may be used. In this case, it is possible to display two-dimensional images by scanning the laser beam that has been modulated in a second one-dimensional direction, in the first one-dimensional direction by the one-dimensional light modulator. It is also possible to obtain the effect of reducing the speckle noise as Embodiment 1 by changing the polarization direction of the laser beam reaching the projection surface 506 temporally by the polarization control unit 500.

Embodiment 3

Figure 9:
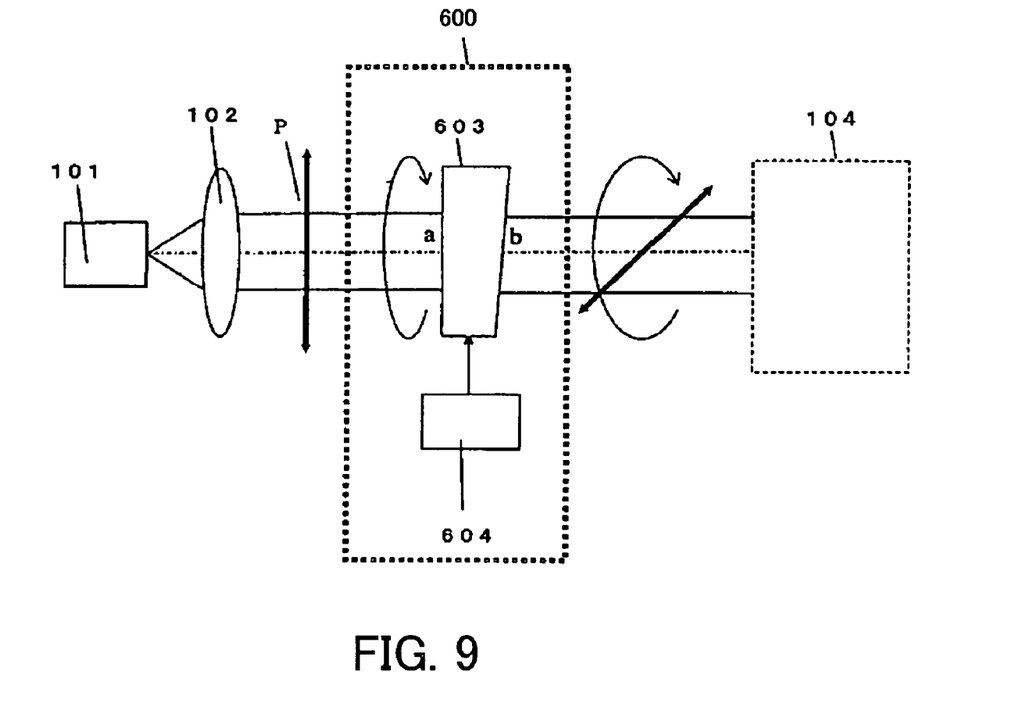
FIG. 9 is a schematic block diagram showing a displaying optical system used for an image projection apparatus that is Embodiment 3 of the present invention.

FIG. 9 is a schematic block diagram showing a displaying optical system used for an image projection apparatus that is Embodiment 3 of the present invention. The displaying optical system in this embodiment has basically the same configuration as that of the displaying optical system in Embodiment 1. However, in this embodiment, a polarization control unit 600 has a wobbling function which changes the impinging position of the laser beam on the scan surface temporally within a range of approximate one pixel.

As Embodiment 1, the divergent luminous fluxes emitted from the laser source 101 are converted into a substantially parallel luminous flux by the collimator lens 102, and then enters the polarization control unit 600. The laser beam emerged from the polarization control unit 600 impinges on the scanning device 104 via the condensing optical system 103, and is scanned on the scan surface. The condensing optical system 103 may be disposed between the scanning device 104 and the scan surface.

The description will hereinafter be given of the structure of the polarization control unit 600 in this embodiment. The laser beam emerged from the collimator lens 102 enters a ½-wave plate 603. The incident surface a and emergent surface b of the ½-wave plate 603 are relatively tilted (in other words, they are not parallel). Specifically, the emergent surface b is tilted with respect to the incident surface a which is substantially orthogonal to the traveling direction of the laser beam, as shown in FIG. 9. The ½-wave plate 603 is rotated by a driving mechanism 604 around an axis which is substantially parallel to the traveling direction of the laser beam.

Figure 10:
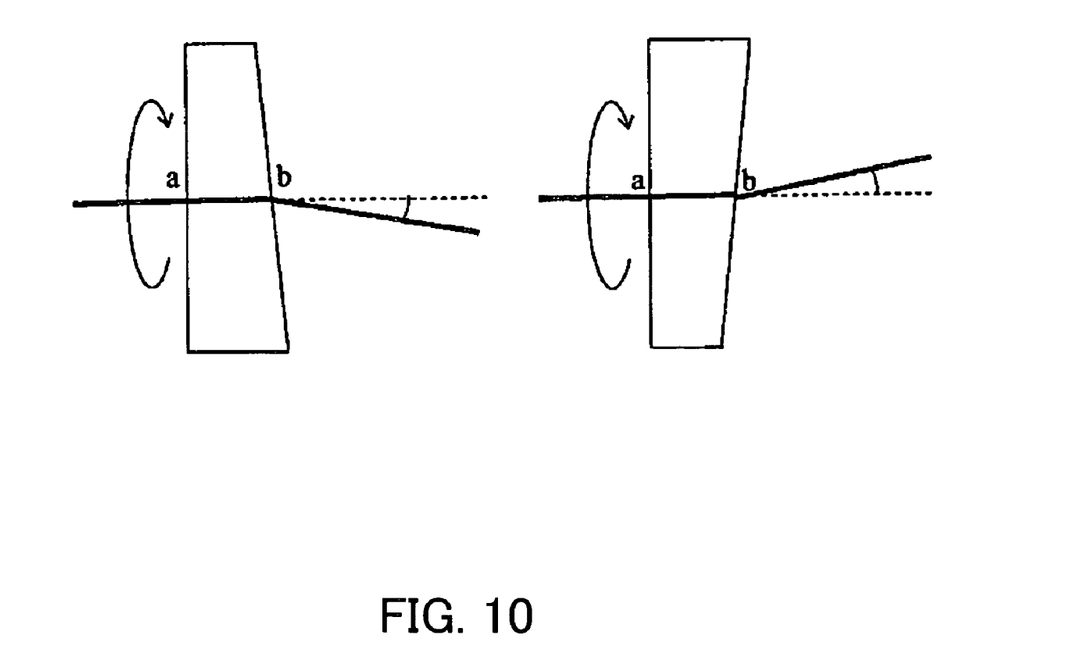
FIG. 10 is an explanatory diagram showing wobbling function in Embodiment 3.

The rotation of the ½-wave plate 603 rotates the polarization direction of the laser beam emerged from the ½-wave plate 603 at a speed twice the rotating speed of the ½-wave plate 603. Since the emergent surface b of the ½-wave plate 603 is tilted with respect to the incident surface a thereof, the emergent angle of the laser beam changes temporally with the rotation of the ½-wave plate 603, as shown in FIG. 10. By scanning the laser beam, in which its emergent angle from the emergent surface b of the ½-wave plate 603 changes, by the scanning device 104 in a two-dimensional direction, the wobbling function for changing the impinging position of the laser beam on the scan surface temporally is realized.

Here, the tilt angle of the emergent surface b of the ½-wave plate 603 is set so that the change of the impinging position of the laser beam on the scan surface may correspond to a range of approximate one pixel, thereby preventing deterioration of the resolution of the displayed image.

In this embodiment, as Embodiment 1, the polarization direction of the laser beam reaching the scan surface is changed temporally by the polarization control unit 600 in which the ½-wave plate 603 is rotated, thereby making it possible to obtain the effect of reducing the speckle noise. Further, the wobbling function which changes the impinging position of the laser beam on the scan surface temporally in a range of approximate one pixel is provided to the polarization control unit 600. Since the surface roughness on the scan surface (for example, a screen) changes according to the impinging position, it is possible to generate a plurality of speckle patterns independent from each other and corresponding to the change of the impinging position of the laser beam. Therefore, overlapping these speckle intensities makes it possible to obtain the greater effect of reducing the speckle noise.

Although a case where a monochromatic laser was used as the laser source was described in this embodiment, color images can be displayed by using three color laser sources of red, green and blue.

As described above, according to each of the above-mentioned embodiments, it is possible to change the polarization state of the laser beam reaching the projection surface such as a screen temporally by the polarization control unit. Since the speckle patterns of the projected image become different patterns depending on the polarization state of the laser beam reaching the projection surface, the speckle pattern changes temporally with the temporal change of the polarization state of the laser beam. Then, when the speckle pattern is changed at a speed higher than the human eye's afterimage time, the speckle intensity changing temporally is integrated by the human eye's afterimage effect. As a result, it is possible to reduce the speckle noise by the overlap of the speckle intensities.

Furthermore, the polarization control unit is constituted by an element which is thin and can lower the loss of light amount compared to a diffusing element, such as a wave plate, a birefringent element and a polarized-wave control element. Therefore, it is possible to realize a compact optical system capable of reducing the speckle noise and projecting bright images with a high quality. Further, since the diameter of the laser beam on the scan surface can be narrowed compared to the case when the diffusing element is used, it is possible to display high-resolution images.

In other words, according to the displaying optical system described in each of the above-mentioned embodiments, it is possible to reduce the speckle noise and improve the image quality while it is a compact optical system capable of reducing the loss of light amount.

Further, providing the polarization control unit with the wobbling function makes it possible to obtain the greater effect of reducing the speckle noise.

In addition, although the laser light was used as coherent light in each of the above-mentioned embodiments, other coherent light may be used in the present invention.

This application claims a foreign priority benefit based on Japanese Patent Applications No. 2004-224788, filed on Jul. 30, 2004, which is hereby incorporated by reference herein in its entirety as if fully set forth herein.

What is claimed is:

1. A displaying optical system which projects images onto a scan surface using coherent light, comprising:
    a light source which emits the light;
    a scanner which scans the scan surface with the light emitted from the light source; and
    a polarization control unit which temporally changes a polarization direction of the light emitted from the light source such that the polarization directions in continuous first and second frames are different by 90 degrees from each other.

2. The displaying optical system according to claim 1, wherein the polarization control unit includes a wave plate, and a driving mechanism which rotates the wave plate.

3. The displaying optical system according to claim 2, wherein the light source emits red light, green light and blue light, and
    the following condition is satisfied:

$\lambda b < \lambda w < \lambda r$ where λw represents the set wavelength of the wave plate, λb represents the wavelength of the blue light, and λr represents the wavelength of the red light.

4. The displaying optical system according to claim 2, wherein the incident surface and emergent surface of the wave plate are relatively tilted.

5. The displaying optical system according to claim 1, wherein the polarization control unit includes:
   an element which has a plurality of portions that give different phase differences, respectively, to a polarization component of the light, the plurality of portions being arranged in a first direction; and
   a driving mechanism which drives the element in the first direction.

6. The displaying optical system according to claim 1, wherein the polarization control unit includes an element which changes the polarization direction according to an input electronic signal.

7. An image projection apparatus comprising:
   the displaying optical system according to claim 1; and
   a light-source modulator which modulates the intensity of the light that is emitted from the light source.

8. An image displaying system comprising:
   the image projection apparatus according to claim 7;
   and an image-signal supplying apparatus which supplies an image signal to the image projection apparatus.

* * * * *